US008206855B2

(12) United States Patent
Kizaki

(10) Patent No.: US 8,206,855 B2
(45) Date of Patent: Jun. 26, 2012

(54) FUEL CELL SYSTEM AND LIQUID DISCHARGING METHOD FOR THE SAME

(75) Inventor: Mikio Kizaki, Toyoake (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1066 days.

(21) Appl. No.: 11/632,661

(22) PCT Filed: Aug. 4, 2005

(86) PCT No.: PCT/JP2005/001401
§ 371 (c)(1),
(2), (4) Date: Jan. 17, 2007

(87) PCT Pub. No.: WO2006/019027
PCT Pub. Date: Feb. 23, 2006

(65) Prior Publication Data
US 2008/0090110 A1   Apr. 17, 2008

(30) Foreign Application Priority Data
Aug. 20, 2004   (JP) ................. 2004-241100

(51) Int. Cl.
*H01M 8/06* (2006.01)

(52) U.S. Cl. ........ 429/414; 429/428; 429/429; 429/443; 429/456; 429/512

(58) Field of Classification Search .................. 429/414, 429/429, 443, 456, 512
See application file for complete search history.

(56) References Cited

U.S. PATENT DOCUMENTS

| 6,358,637 B1 | 3/2002 | Fuss |
| 6,475,655 B1 | 11/2002 | Nakanishi et al. |
| 2003/0129462 A1 * | 7/2003 | Yang et al. ...................... 429/17 |
| 2004/0067399 A1 * | 4/2004 | Kobayashi et al. ............. 429/25 |
| 2005/0053809 A1 * | 3/2005 | Hayashi et al. ................. 429/13 |

FOREIGN PATENT DOCUMENTS

| DE | 100 61 687 A1 | 7/2001 |
| JP | A 56-114287 | 9/1981 |
| JP | A 04-308662 | 10/1992 |
| JP | A 2002-260698 | 9/2002 |
| JP | A 2003-178791 | 6/2003 |
| JP | A 2003-203665 | 7/2003 |
| JP | A 2003-317766 | 11/2003 |
| JP | A 2003-331889 | 11/2003 |
| JP | A 2004-139984 | 5/2004 |
| JP | A 2004-213944 | 7/2004 |

* cited by examiner

*Primary Examiner* — Patrick Ryan
*Assistant Examiner* — Ben Lewis
(74) *Attorney, Agent, or Firm* — Oliff & Berridge, PLC

(57) ABSTRACT

A fuel cell system capable of reliably and rapidly discharging liquid in a fuel cell stack to the outside is provided. In a fuel cell system having a discharge path (76) that allows discharge of at least liquid in a fuel cell stack (20), at the time of actuation of the fuel cell stack (20), reaction gas is supplied to the fuel cell stack (20) at a higher speed or in a greater amount than during normal operation of the fuel cell stack (20). By supplying the reaction gas at a high speed or in a great amount before actuation, residual liquid in the fuel cell stack (20) can be blown off and thus reliably and rapidly discharged to the outside. The residual liquid can be discharged more easily when a volume (30) is provided in the discharge path (76) or the pressure inside the fuel cell stack (20) is set to a negative level at the time of actuation thereof.

17 Claims, 4 Drawing Sheets

FUEL CELL SYSTEM AND LIQUID DISCHARGING METHOD FOR THE SAME

BACKGROUND

The present invention relates to a fuel cell system, and particularly to a fuel cell system capable of efficiently discharging liquid remaining in a fuel cell stack at the time of actuation of the fuel cell and liquid discharging method for the same.

A Fuel cell has attracted attention as an environmentally friendly, clean power source. The fuel cell uses fuel gas such as hydrogen and oxidation gas such as air to generate power by an electrochemical reaction. Water (water vapor) is also generated by the electrochemical reaction of fuel gas with oxidation gas. Thus, the generated water is discharged appropriately during the operation of the fuel cell.

When the operation of the fuel cell is restarted after it is once stopped, however, the generated water and the dew condensation water remaining in the fuel cell stack would hinder smooth restart thereof if they are not removed. Although it may be conceivable to remove the generated water and the dew condensation water by causing a circulating pump in a fuel gas circulating system to operate at a high speed, it will increase the noise.

Japanese Patent Laid-Open No. 2003-317766 discloses a configuration where a purge valve is disposed in a fuel gas circulating system, and the purge valve is made open upon occurrence of clogging of drain to temporarily increase the flow rate of fuel gas to thereby solve the clogging of drain.

However, It is difficult to fully discharge the liquid in the system (the generated water, dew condensation water) by simply increasing the flow rate of fuel gas.

SUMMARY

The present invention has been made to solve the above-described problems of the conventional art. It is an object of the present invention to provide a fuel cell system capable of reliably and rapidly discharging liquid within a fuel cell stack at the time of actuation of the fuel cell stack.

To achieve the above object, according to the present invention, there is provided a fuel cell system having a discharge path allowing discharge of at least liquid in a fuel cell stack, wherein at the time of actuation of the fuel cell stack, reaction gas of a higher speed than reaction gas supplied during normal operation of the fuel cell stack is supplied to the fuel cell stack. By supplying reaction gas with a high speed, residual liquid in the fuel cell stack can be blown off and thus reliably and rapidly discharged. As used herein, the reaction gas refers to at least one of fuel gas (hydrogen) and oxidation gas (oxygen or air). While the speed of reaction gas depends on the system configurations such as the fuel cell stack, pump, shape of the pipe, pressure of the hydrogen tank, pressure regulating valve and others, it may be for example 1000 liters/minute or more, preferably 5000 liters/minute or more, or the reaction gas of high pressure and high speed of preferably 10000 liters/minute or more may be supplied.

According to an aspect of the fuel cell system of the present invention, preferably the fuel cell stack has a supply port and a discharge port for the reaction gas, and the reaction gas is supplied to the fuel cell stack via the supply port and discharged to the discharge path via the discharge port.

According to an aspect of the fuel cell system of the present invention, preferably, at the time of actuation of the fuel cell stack, the reaction gas is supplied to the fuel cell stack in an amount greater than the supply amount for the reaction gas during normal operation. With this configuration, the reaction gas of a large amount is supplied, which can blow off and, hence, reliably and rapidly discharge the residual liquid within the fuel cell stack.

According to an aspect of the fuel cell system of the present invention, preferably, at the time of actuation of the fuel cell stack, the reaction gas is supplied to the fuel cell stack with a negative pressure state formed inside the fuel cell stack. With this configuration, the pressure inside the fuel cell stack is set to a negative level, and thus, reaction gas of high pressure and high speed, or reaction gas of a greater amount, can be supplied.

Preferably, the negative pressure state is established by generating power in the fuel cell stack before supplying reaction gas. Alternatively, a pump is preferably provided in the discharge path, and the negative pressure state is established by driving the pump.

According to an aspect of the fuel cell system of the present invention, preferably the system includes a variable pressure regulating valve provided between a supply source for the reaction gas and the fuel cell stack, wherein at the time of actuation of the fuel cell stack, the variable pressure regulating valve is employed so that the fuel cell stack is supplied with reaction gas of a higher pressure than a supply pressure of reaction gas during normal operation. With this configuration, the variable pressure regulating valve enables supply of the reaction gas of high pressure and high speed.

According to an aspect of the fuel cell system of the present invention, preferably the system further includes: a pressure regulating valve provided between a supply source for the reaction gas and the fuel cell stack; and a bypass path bypassing the pressure regulating valve. Reaction gas is supplied from the bypass path to the fuel cell stack at the time of actuation of the fuel cell stack, and reaction gas is supplied via the pressure regulating valve to the fuel cell stack during normal operation of the fuel cell stack.

According to an aspect of the fuel cell system of the present invention, preferably, at the time of actuation of the fuel cell stack, supply of the reaction gas is carried out a plural number of times. This ensures that the residual liquid is removed more reliably.

According to an aspect of the fuel cell system of the present invention, preferably a volume is provided in the discharge path. This enables supply of reaction gas of a large amount, or enables reaction gas of a large amount to be temporarily pooled rather than discharged.

According to an aspect of the fuel cell system of the present invention, preferably the system further includes: a supply path for supplying reaction gas to the fuel cell stack; and a circulating path connected to the supply path and for returning reaction gas discharged from the fuel cell stack to the supply path.

Preferably, a volume is provided in the circulating path.

Still preferably, the circulating path is a part of the discharge path.

According to an aspect of the fuel cell system of the present invention, preferably reaction gas is fuel gas.

Preferably, at the time of actuation of the fuel cell stack, fuel gas is supplied to the fuel cell stack at a higher speed than during normal operation, and oxidation gas is supplied to the fuel cell stack at a higher speed than in the normal operation.

According to the present invention, there is provided a liquid discharging method for a fuel cell system discharging at least liquid from a fuel cell stack, wherein at the time of actuation of the fuel cell stack, reaction gas of a higher speed than reaction gas supplied during normal operation of the fuel cell stack is supplied to the fuel cell stack.

Further, in light of the circumstances under which the present invention was made, the present invention can be interpreted from other points of view as follows.

According to the present invention, there is provided another fuel cell system having a discharge path allowing discharge of liquid in a fuel cell stack, wherein at the time of actuation of the fuel cell, reaction gas of a higher speed than reaction gas supplied in a normal operation of the fuel cell is supplied to the fuel cell stack. By supplying reaction gas with a high speed, residual liquid within the fuel cell stack can be blown off and thus reliably and rapidly discharged.

According to the present invention, there is provided yet another fuel cell system having a discharge path allowing discharge of liquid in a fuel cell stack, wherein at the time of actuation of the fuel cell, reaction gas of a supply amount greater than a supply amount of the reaction gas in a normal operation of the fuel cell is supplied to the fuel cell stack. By supplying reaction gas of a large amount, residual liquid within the fuel cell stack can be blown off and thus reliably and rapidly discharged.

Further, according to the present invention, there is provided another fuel cell system having a discharge path allowing discharge of liquid in a fuel cell stack, wherein at the time of actuation of the fuel cell, reaction gas is supplied to the fuel cell stack with a negative pressure state formed inside the stack. By setting the pressure inside the stack at a negative level, reaction gas of high pressure and high speed, or reaction gas of a greater amount, can be supplied.

Preferably, the negative pressure state is formed by generating power in the fuel cell before supply of reaction gas.

Further, according to the present invention, there is provided yet another fuel cell system having a discharge path allowing discharge of liquid in a fuel cell stack, further including a variable pressure regulating valve provided between a supply source for reaction gas and the fuel cell stack, wherein at the time of actuation of the fuel cell, the variable pressure regulating valve is employed so that the fuel cell stack is supplied with reaction gas of a higher pressure than a supply pressure of reaction gas in a normal operation. With the variable pressure regulating valve, reaction gas of high pressure and high speed can be supplied.

Preferably, the fuel cell system has a volume in the discharge path.

Preferably, in each of the fuel cell systems described above, supply of reaction gas is carried out a plural number of times at the time of actuation of the fuel cell.

According to the present invention described above, it is possible to provide a fuel cell system capable of reliably and rapidly discharging liquid in a fuel cell stack and a liquid discharging method for the same.

DETAILED DESCRIPTION

Preferred embodiments of the present invention will be described below with reference to the drawings, citing an example where the present invention is applied to a vehicle.

1. Configuration of First Embodiment

Figure 1:
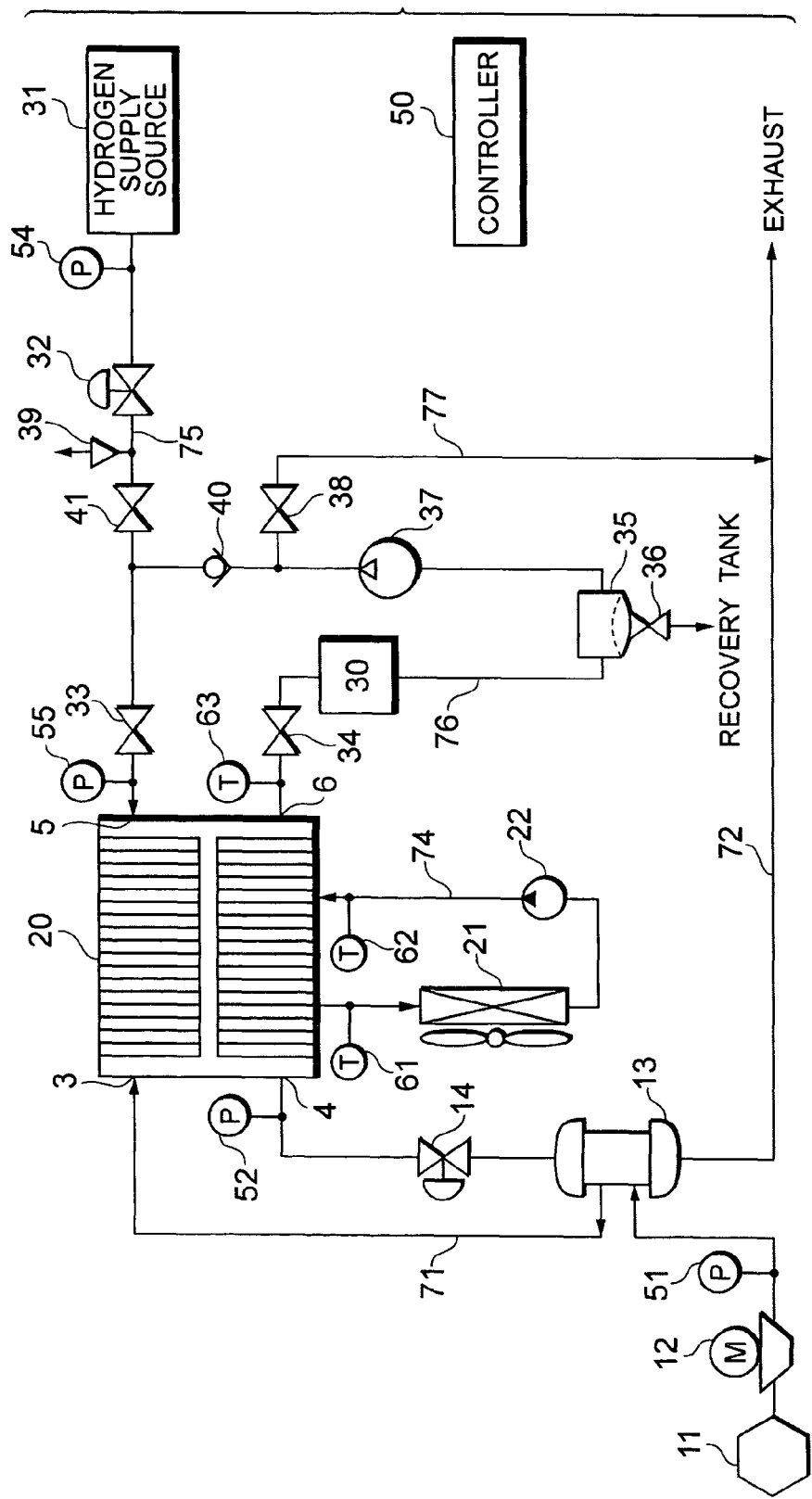
FIG. 1 is a configuration diagram schematically showing a fuel cell system to which the present invention is applied.

FIG. 1 is a configuration diagram schematically showing a fuel cell system according to a first embodiment of the present invention.

As shown in the figure, air (ambient air) as oxidation gas is supplied via an air supply path 71 to an air supply port 3 of a fuel cell stack 20. The air supply path 71 is provided with an air filter 11 for removing fine particles from air, a compressor 12 for pressurizing air, a pressure sensor 51 for detecting supply air pressure, and a humidifier 13 for adding required moisture to the air. The air filter 11 is provided with an airflow meter (flowmeter), which is not shown, for detecting the flow rate of air.

Air off-gas discharged from an air exhaust port 4 of the fuel cell stack 20 is discharged via an exhaust path 72 to the outside. The exhaust path 72 is provided with a pressure sensor 52 for detecting exhaust pressure, a pressure regulating valve 14, and a heat exchanger of the humidifier 13. The pressure regulating valve (pressure reducing valve) 14 functions as a pressure governor that sets the pressure of air (air pressure) supplied to the fuel cell stack 20. Detection signals, which are not shown, of the pressure sensors 51 and 52 are transmitted to a controller 50. The controller 50 controls the compressor 12 and the pressure regulating valve 14 to set supply air pressure, supply flow rate and the like.

Hydrogen gas as fuel gas is supplied from a hydrogen supply source 31 via a fuel supply path 75 to a hydrogen supply port 5 of the fuel cell stack 20. The hydrogen supply source 31 may be composed, for example, of a high pressure hydrogen tank, a fuel reformer, a hydrogen storage tank, or the like. The fuel supply path 75 is provided with a pressure sensor 54 for detecting the pressure of the hydrogen supply source, a hydrogen pressure regulating valve 32 for regulating the supply pressure of the hydrogen gas to the fuel cell stack 20, a shut-off valve 41, a relief valve 39 that is made open when the pressure in the fuel supply path 75 is abnormal, a shut-off valve 33, and a pressure sensor 55 for detecting the inlet pressure of the hydrogen gas. Detection signals, not shown, of the pressure sensors 54 and 55 are supplied to the controller 50. Preferably, the hydrogen pressure regulating valve 32 is a variable pressure regulating valve capable of changing a pressure regulation value. The variable pressure regulating valve enables supply of the fuel gas at high pressure and high speed, as well as supply at normal pressure and normal flow velocity. Particularly, at the time of actuation of the fuel cell stack 20, fuel gas of higher pressure and higher speed than during normal operation is supplied. For example, fuel gas is supplied at high pressure and high speed at a rate of 1000 liters/minute or more, preferably 5000 liters/minute or more, or more preferably 10000 liters/minute or more. As used herein, the normal operation refers to the state where actuation of the fuel cell stack 20 has completed and the fuel cell system is normal, and where the fuel cell stack 20 generates power corresponding to required power. Power of a wide range from low power to high power is required according to a load (for example, a drive motor in the case of a vehicle, or a driver's request for acceleration), and the range of such required power may be interpreted to correspond to the normal operation. Further, the supply state (pressure, flow velocity, flow rate) of fuel gas or oxidation gas during the operation of the fuel cell stack 20 corresponding to the range of the required power from the low power to the high power may be interpreted as the supply state of reaction gas in the normal operation.

As such, in the present embodiment, the supply state of fuel gas (reaction gas) at the time of actuation of the fuel cell stack 20 takes a value greater than that of the supply state of reaction gas during normal operation. As another embodiment, the supply state of reaction gas corresponding to a part of the range during normal operation where the required power is higher than in the other part may be interpreted as the supply state of reaction gas at the time of actuation. In other words, reaction gas can be supplied in the supply state of reaction gas near the upper limit power in the normal operation of the fuel cell stack 20. As such, the supply state of reaction gas at the time of actuation and the supply state of reaction gas during normal operation may be set appropriately according to the rated value of the fuel cell system.

It is noted that the present invention can be implemented without using the variable pressure regulating valve, as will be described later.

Hydrogen gas that was not consumed in the fuel cell stack 20 is discharged to a hydrogen circulating path 76 as hydrogen off-gas, which is returned to the downstream side of the shut-off valve 41 in the fuel supply path 75. The hydrogen circulating path 76 is provided with a temperature sensor 63 for detecting a temperature of hydrogen off-gas, a shut-off valve 34 for controlling discharge of hydrogen off-gas, a gas-liquid separator 35 for recovering water from hydrogen off-gas, a drain valve 36 for collecting the recovered water to a tank, which is not shown, a hydrogen pump 37 for pressurizing hydrogen off-gas, and a check valve 40. A detection signal, not shown, of the temperature sensor 63 is supplied to the controller 50. The controller 50 controls the operation of the hydrogen pump 37. Hydrogen off-gas joins the flow of hydrogen gas in the fuel supply path 75, to be supplied to the fuel cell stack 20 for reuse. The check valve 40 prevents hydrogen gas in the fuel supply path 75 from reversely flowing into the hydrogen circulating path 76.

The hydrogen circulating path 76 (discharge path) is connected to the exhaust path 72 via a purge valve 38 by way of a purge flow path 77. The purge valve 38 is an electromagnetic type shut-off valve, which is activated in accordance with a command from the controller 50 to externally release (purge) hydrogen off-gas. Performing this purging operation intermittently can prevent an undesirable situation where the impurity content of hydrogen gas on the fuel electrode side increases and thus the cell voltage decreases because of repeated circulation of hydrogen off-gas. Preferably, a volume 30 is provided in the vicinity of an exit 6 (exhaust port) of the fuel cell stack 20 to temporarily store hydrogen off-gas. This volume 30 can retrieve hydrogen gas even if hydrogen gas is introduced in a large amount at the time of actuation of the fuel cell stack 20. In the case of not providing the volume 30, it may be configured such that hydrogen gas supplied to the fuel cell stack 20 at high pressure is guided to the hydrogen circulating path 76 and discharged via the purge valve 38 or the like as required.

Further, at a port opening for coolant of the fuel cell stack 20, a cooling path 74 for circulating the coolant is provided. The cooling path 74 is provided with a temperature sensor 61 for detecting a temperature of the coolant discharged from the fuel cell stack 20, a radiator (heat exchanger) 21 for releasing heat of the coolant to the outside, a pump 22 for pressurizing and circulating the coolant, and a temperature sensor 62 for detecting the temperature of the coolant supplied to the fuel cell stack 20.

The controller 50 receives load requirement such as an accelerator signal of a vehicle, not shown, and control information from various sensors of the fuel cell system and the like, and controls the operations of the valves and motors. The controller 50 is configured with a control computer system, which is not shown. The control computer system may be any of known available systems.

2. Control Flow

Figure 2:
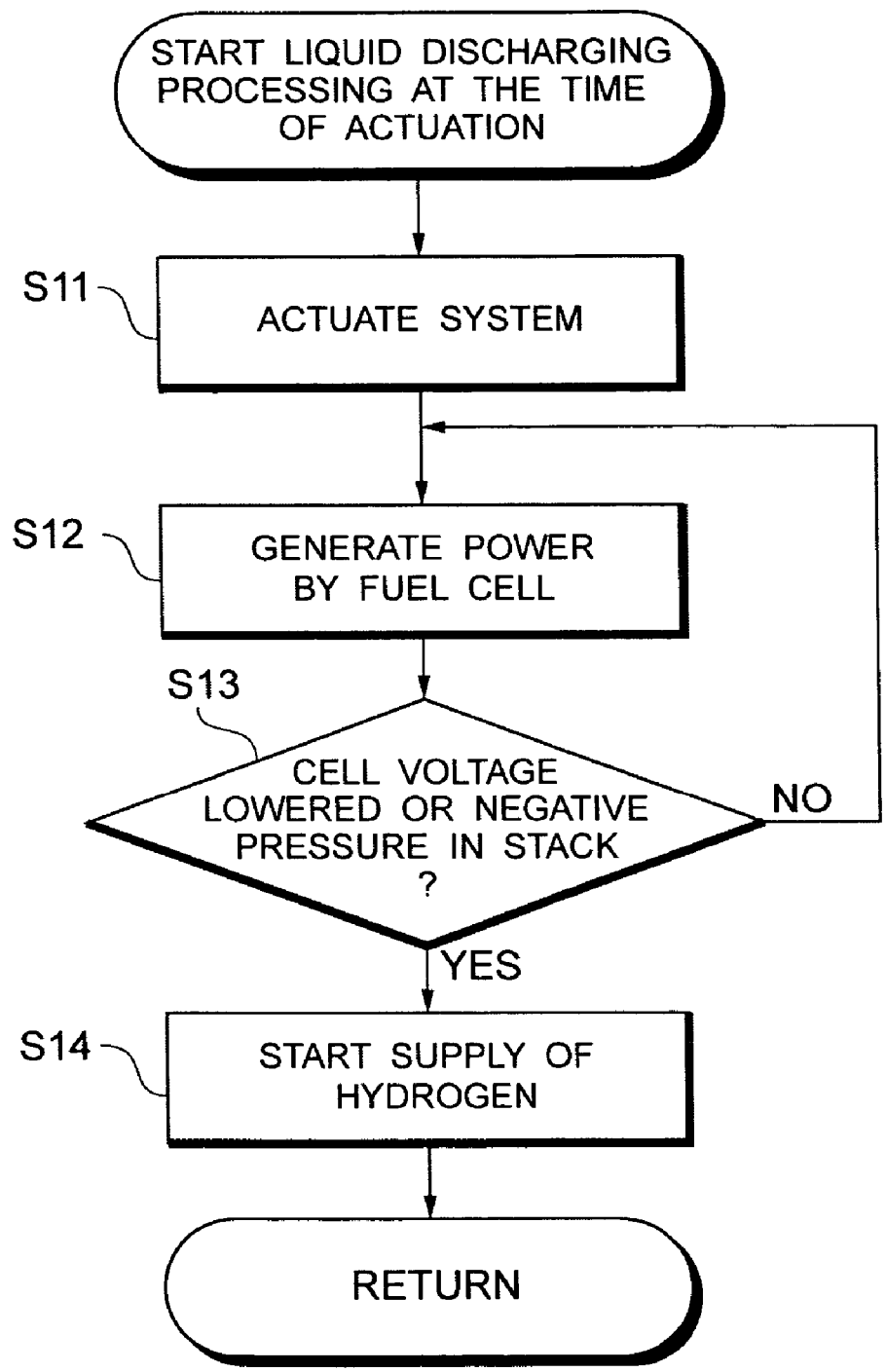
FIG. 2 is a flowchart showing a procedure of liquid discharging processing at the time of actuation according to a fuel cell system of a first embodiment.

A liquid discharging operation at the time of actuation by the controller 50 in the fuel cell system according to the first embodiment will now be described with reference to the flowchart shown in FIG. 2. The controller 50 is configured with a control computer, as described above, which controls operations of the various parts of the fuel cell system in accordance with a control program, which is not shown.

In the first embodiment, immediately after the actuation of the fuel cell stack 20, the fuel cell stack 20 uses hydrogen gas remaining in the system to generate power. This creates a negative pressure state in the stack 20. Thereafter, hydrogen gas is supplied from the hydrogen supply source 31.

Firstly, after the actuation of the fuel cell stack 20 (step 11), power is generated without supply of hydrogen gas (step 12). More specifically, power is generated in the state where the shut-off valve 33 is closed. In this manner, the hydrogen gas remaining in the system is consumed to produce the negative pressure state in the fuel cell stack 20. The power thus generated is charged to a battery, which is not shown, or used for driving auxiliary machines. Next, lowering of the cell voltage or a negative pressure in the fuel cell stack 20 is detected (step 13). The lowering of the cell voltage indicates that only a small amount of hydrogen gas is left to be consumed, and thus, the process proceeds to the next step regardless of whether the pressure inside the stack 20 is at a negative level or not. Unless such lowering of the cell voltage or a negative pressure in the fuel cell stack 20 is detected (step 13: NO), the process returns to step 12 to continue the power generating operation.

When the cell voltage is lowered or the pressure in the fuel cell stack becomes negative (step 13: YES), hydrogen gas is supplied from the hydrogen supply source 31 (step 14). When the pressure in the fuel cell stack 20 is negative, hydrogen introduced to the fuel cell stack 20 flows at a high speed, which enables removal of the residual liquid such as the generated water and the dew condensation water. The way of supplying hydrogen gas is not limited as long as hydrogen gas can be supplied at a high pressure. For example, a method using the variable pressure regulating valve as described above, a method using an unillustrated bypass path bypassing the hydrogen pressure regulating valve 32, as will be described later, a method using an unillustrated pump for pressurizing, or the circulating pump 37, may be utilized to form the negative pressure state. Further, the processing in steps 12-14 described above may be repeated a plural number of times. Still further, the volume 30 does not necessarily have to be provided at the downstream of the fuel cell stack 20.

Figure 3:
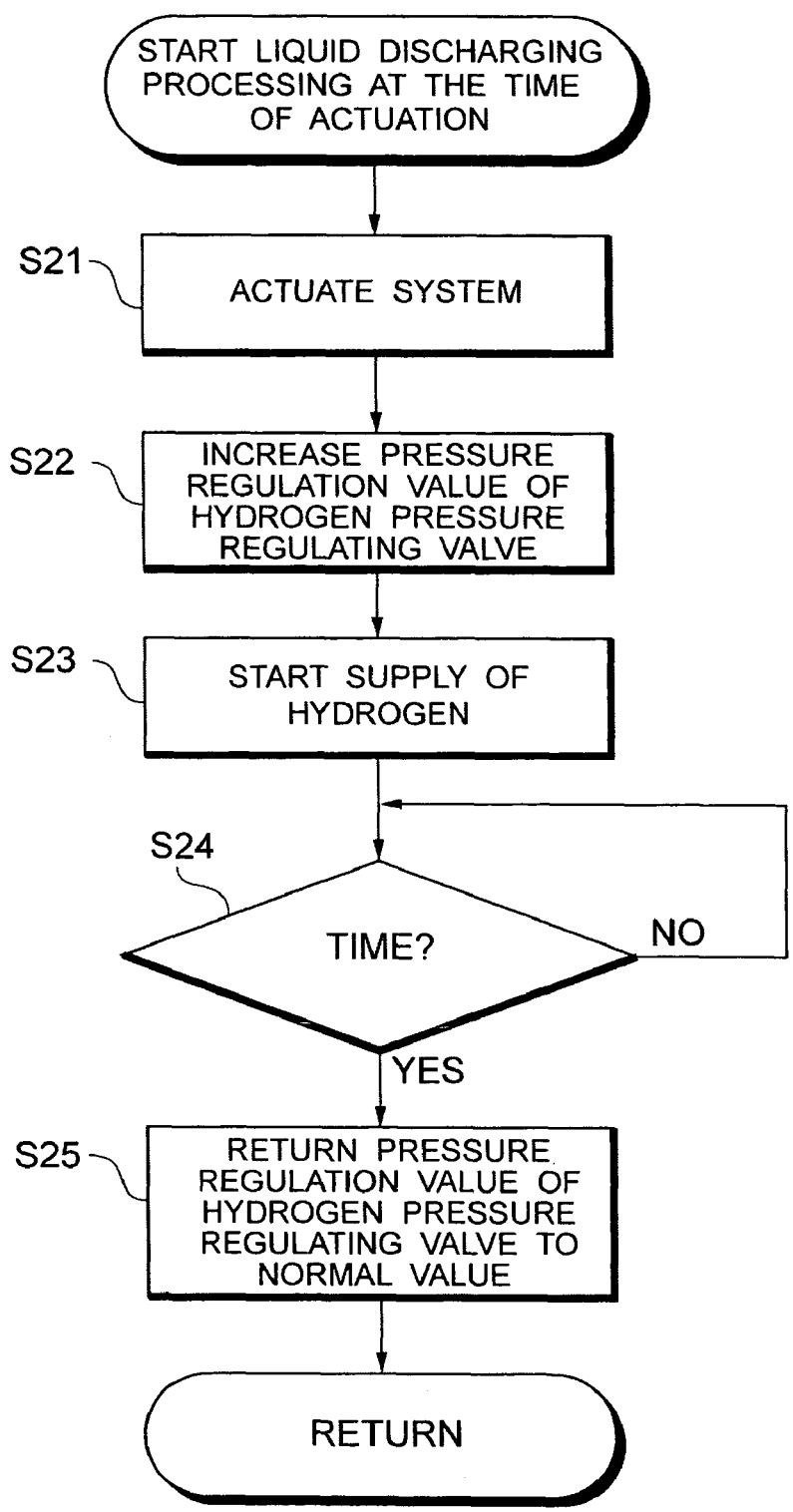
FIG. 3 is a flowchart showing a procedure of liquid discharging processing at the time of actuation according to a fuel cell system of a second embodiment.

Hereinafter, a liquid discharging operation at the time of actuation by a controller 50 in a fuel cell system according to a second embodiment will be described with reference to the flowchart shown in FIG. 3.

In the second embodiment, the variable pressure regulating valve 32 described above is used such that immediately after actuation of the fuel cell stack 20, hydrogen gas of a higher pressure than during normal operation is supplied to the fuel cell stack 20.

Firstly, after actuation of the fuel cell stack 20 (step 21), the pressure regulation value of the hydrogen pressure regulating valve is set high (step 22). The controller 50 carries out this setting. Supply of hydrogen gas from the hydrogen supply source 31 is started (step 23). The supply of hydrogen gas is continued for a predetermined period of time (S24) to remove the residual liquid, and then, the hydrogen pressure regulation value is returned to a normal value (step 25). In this manner, hydrogen gas of high pressure is introduced to the fuel cell stack 20 to remove the residual liquid such as the generated water and the dew condensation water.

Figure 4:
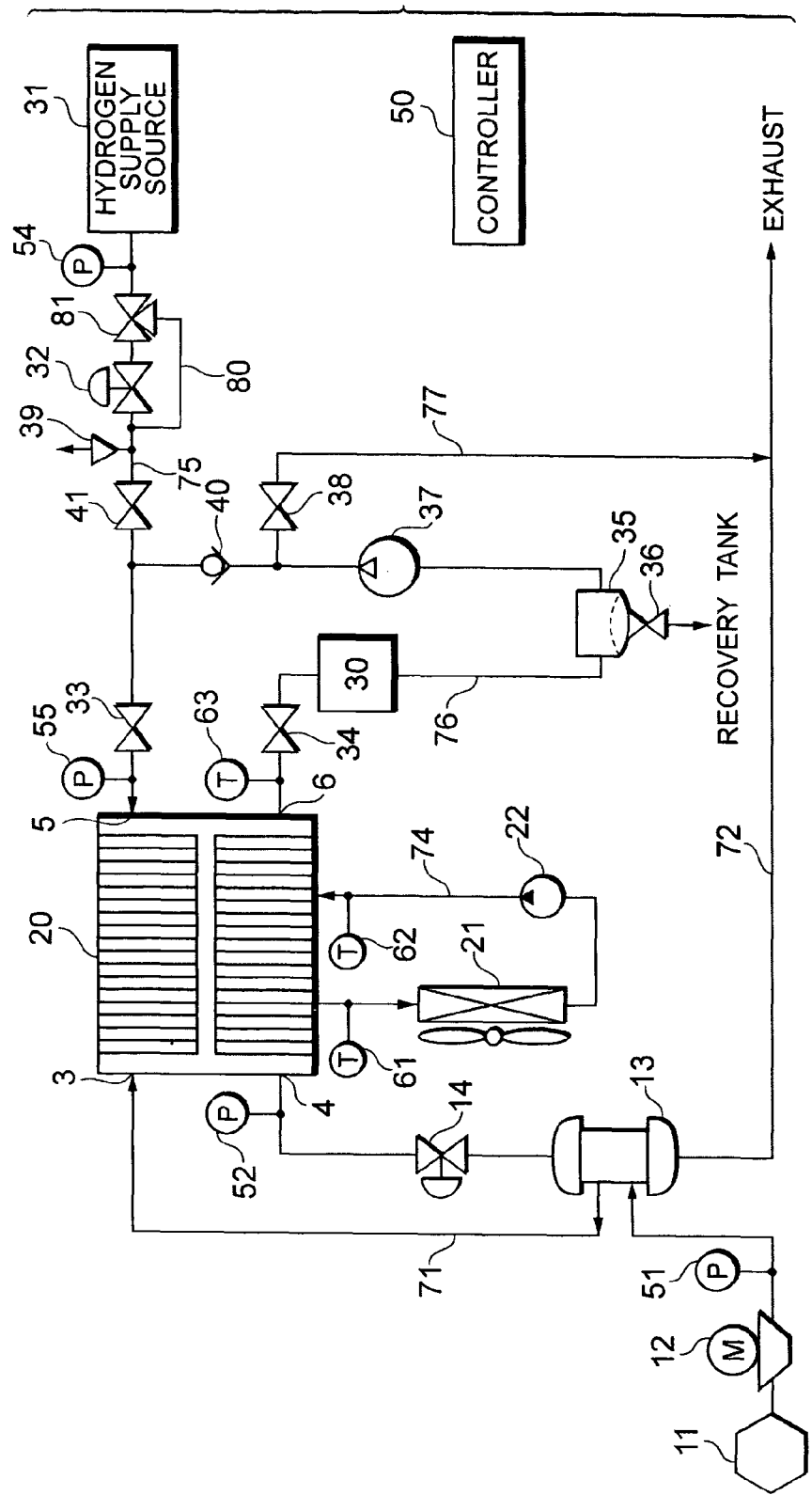
FIG. 4 is a configuration diagram schematically showing a fuel cell system of a third embodiment.

Hereinafter, a liquid discharging operation of a fuel cell system according to a third embodiment shown in FIG. 4 will be described, focusing on the differences.

The third embodiment differs from the first embodiment in that the hydrogen pressure regulating valve 32 is not a variable pressure regulating valve, but a mechanical type pressure regulating valve, and in that a bypass path 80 bypassing the hydrogen pressure regulating valve 32 is provided and an on-off valve 81 for switching to the bypass path 80 is also provided.

The mechanical type hydrogen pressure regulating valve 32 is, e.g., a diaphragm type valve, which controls the hydrogen supply pressure to the fuel cell stack 20 by a balance of the thrust acting on both surfaces of the diaphragm. The mechanical-pressure regulating valve of this type may be one utilizing the atmospheric pressure, or may be one utilizing a spring or the like.

The bypass path 80 is provided in parallel with the fuel supply path 75 so as not to go through the hydrogen pressure regulating valve 32. The upstream-side connection point of the bypass path 80 to the fuel supply path 75 is at the first port of the on-off valve 81 located between the hydrogen pressure regulating valve 32 and the hydrogen supply source 31. The downstream-side connection point of the bypass path 80 to the fuel supply path 75 is located between the hydrogen pressure regulating valve 32 and the relief valve 39. The positions of the upstream-side and downstream-side connection points, however, are not limited thereto.

The on-off valve 81 is, e.g., an electromagnetic type three-way valve, of which open/closed state is controlled by the controller 50. The second port on the inlet side of the on-off valve 81 is connected to the hydrogen supply source 31 side of the fuel supply path 75, while the third port of the on-off valve 81 is connected to the hydrogen pressure regulating valve 32 side of the fuel supply path 75. By setting the on-off valve 81 to the open state or the closed state, a supply path for the hydrogen gas to the fuel cell stack 2 can be switched between the hydrogen pressure regulating valve 32 and the bypass path 80. It is noted that, in place of the above-described configuration, an on-off valve 81 having two ports may be provided on the bypass path 80.

To supply hydrogen to the fuel cell stack 20 at a high speed so as to remove the residual liquid such as the generated water and the dew condensation water within the fuel cell stack 20, the controller 50 may carry out the following control. At the time of actuation of the fuel cell stack 20, it may switch the on-off valve 81 to the bypass path 80 side, to supply hydrogen to the fuel cell stack 20 from the bypass path 80, not via the hydrogen pressure regulating valve 32. On the other hand, during normal operation of the fuel cell stack 20, it may switch the on-off valve 81 to the normal position, to supply hydrogen to the fuel cell stack 20 via the hydrogen pressure regulating valve 32, not through the bypass path 80. Note that in the case where the on-off valve 81 having two ports is provided on the bypass path 80, when the on-off valve 81 is closed (during normal operation), hydrogen is output in the state where the primary pressure is reduced to a prescribed secondary pressure by the hydrogen pressure regulating valve 32. On the other hand, when the on-off valve 81 on the bypass path 80 is open, for example at the time of actuation of the fuel cell stack 20, hydrogen is output to the downstream through the bypass path 81 in the state where the primary pressure is not regulated (reduced). As such, the hydrogen pressure regulating valve 32 becomes a flow-path resistance, and thus, the hydrogen flowing through the hydrogen pressure regulating valve 32 is smaller in amount than the hydrogen flowing through the bypass path 80.

Although fuel gas (reaction gas) on the anode side has been described by way of example in each of the above embodiments, the same applies to the cathode side as well. That is, on the cathode side, at the time of actuation of the fuel cell stack 20, oxidation gas (reaction gas) can be supplied to the fuel cell stack at a higher speed than the supply amount of the oxidation gas in the normal operation. As a result, the generated water and the dew condensation water on the cathode side can be discharged to the outside. Preferably, at the time of actuation of the fuel cell stack 20, oxidation gas is supplied to the fuel cell stack 20 at a higher speed than the gas supply amount during the normal operation, concurrently on the anode side and the cathode side. This can reduce the transmembrane pressure difference between the anode and the cathode. In this manner, the generated water and the dew condensation water can be discharged to the outside while suppressing damages to the electrolyte membrane in unit cells within the stack 20.

It is noted that the supply of high-pressure hydrogen gas can be stopped by detecting the pressure inside the fuel cell stack 20, the pressure of the discharge gas, the flow rate and the like.

Further, high-pressure hydrogen gas as described above may be introduced a plural number of times.

Although the volume 30 is provided at the downstream in the fuel cell stack 20 in the present embodiment, it does not necessarily have to be provided.

Each embodiment described above may be used alone or in combination. Furthermore, introduction of high-pressure hydrogen gas may be carried out a plural number of times.

The invention claimed is:

1. A liquid discharging method for a fuel cell system including a discharge path allowing discharge of at least liquid in a fuel cell stack, the method comprising:
   supplying, at the time of actuation of the fuel cell stack, reaction gas of a higher speed than reaction gas supplied during normal operation of the fuel cell stack to the fuel cell stack;
   establishing the negative pressure state by generating power in the fuel cell stack before supplying the reaction gas; and
   discharging the liquid in the fuel cell stack from the fuel cell stack, wherein
      the reaction gas is supplied to the fuel cell stack with a negative pressure state formed inside the fuel cell stack, the negative pressure state being formed in the fuel cell stack before supplying the reaction gas, and
      the reaction gas is supplied at the higher speed, which enables the liquid in the fuel cell stack to be discharged from the fuel cell stack.

2. The liquid discharge method according to claim 1, wherein
   the fuel cell stack has a supply port and a discharge port for the reaction gas, and
   the reaction gas is supplied to the fuel cell stack via the supply port and discharged to the discharge path via the discharge port.

3. The liquid discharge method according to claim 1, wherein at the time of actuation of the fuel cell stack, the reaction gas is supplied to the fuel cell stack at a rate equal to or more than 1000 liters/minute.

4. The liquid discharge method according to claim 3, wherein at the time of actuation of the fuel cell stack, the reaction gas is supplied to the fuel cell stack at a rate equal to or more than 5000 liters/minute.

5. The liquid discharge method according to claim 1, wherein at the time of actuation of the fuel cell stack, the reaction gas is supplied to the fuel cell stack in an amount greater than the supply amount for the reaction gas during normal operation.

6. The liquid discharge method according to claim 1, the fuel cell system including a pump provided in the discharge path, the method further comprising:
   establishing the negative pressure state by driving the pump.

7. The liquid discharge method according to claim 1, the fuel cell system including a variable pressure regulating valve provided between a supply source for the reaction gas and the fuel cell stack, the method further comprising:
   employing, at the time of actuation of the fuel cell stack, the variable pressure regulating valve so that the fuel cell stack is supplied with reaction gas of a higher pressure than the supply pressure of the reaction gas during normal operation.

8. The liquid discharge method according to claim 1, the fuel cell system including a pressure regulating valve provided between a supply source for the reaction gas and the fuel cell stack and a bypass path bypassing the pressure regulating valve, the method further comprising:
   supplying, at the time of actuation of the fuel cell stack, the reaction gas from the bypass path to the fuel cell stack, and
   supplying, during normal operation of the fuel cell stack, the reaction gas via the pressure regulating valve to the fuel cell stack.

9. The liquid discharge method according to claim 1, wherein at the time of actuation of the fuel cell stack, supply of the reaction gas is carried out a plural number of times.

10. The liquid discharge method according to claim 1, wherein a volume is provided in the discharge path.

11. The liquid discharge method according to claim 1, the fuel cell system including a supply path for supplying the reaction gas to the fuel cell stack; and a circulating path connected to the supply path, for returning the reaction gas discharged from the fuel cell stack to the supply path.

12. The liquid discharge method according to claim 11, wherein a volume is provided in the circulating path.

13. The liquid discharge method according to claim 11, wherein the circulating path is a part of the discharge path.

14. The liquid discharge method according to claim 11, the fuel cell system including a shut-off valve in the supply path, the method further comprising:
   establishing the negative pressure state by generating power in the fuel cell stack with the shut-off valve closed, and
   opening the shut-off valve and supplying the reaction gas to the fuel cell stack when a predetermined negative pressure state is established in the fuel cell stack.

15. The liquid discharge method according to claim 1, wherein the reaction gas is fuel gas.

16. The liquid discharge method according to claim 15, wherein at the time of actuation of the fuel cell stack, the fuel gas is supplied to the fuel cell stack at a higher speed than during normal operation, and oxidation gas is supplied to the fuel cell stack at a higher speed than during normal operation.

17. The liquid discharge method according to claim 1, wherein
   the liquid discharged from the fuel cell stack by the reaction gas supplied at the higher speed is a residual liquid.

* * * * *

UNITED STATES PATENT AND TRADEMARK OFFICE
CERTIFICATE OF CORRECTION

| | |
|---|---|
| PATENT NO. | : 8,206,855 B2 |
| APPLICATION NO. | : 11/632661 |
| DATED | : June 26, 2012 |
| INVENTOR(S) | : Mikio Kizaki |

It is certified that error appears in the above-identified patent and that said Letters Patent is hereby corrected as shown below:

On the Title Page, Item (86), delete "PCT/JP2005/001401" and insert --PCT/JP2005/014701--.

Signed and Sealed this
Second Day of October, 2012

David J. Kappos
*Director of the United States Patent and Trademark Office*